(No Model.)

A. WYCKOFF.
VEHICLE WHEEL.

No. 278,479. Patented May 29, 1883.

Attest:
Comt. A. Cooper
H. E. Hansmann

A. Wyckoff
Inventor:
By Charles E. Foster
Atty.

UNITED STATES PATENT OFFICE.

ARCALOUS WYCKOFF, OF ELMIRA, NEW YORK.

VEHICLE-WHEEL.

SPECIFICATION forming part of Letters Patent No. 278,479, dated May 29, 1883.

Application filed March 14, 1883. (No model.)

*To all whom it may concern:*

Be it known that I, ARCALOUS WYCKOFF, a citizen of the United States, and a resident of Elmira, in the county of Chemung and State of New York, have invented certain new and useful Improvements in Vehicle-Wheels, of which the following is a specification.

My invention relates to that class of vehicles supported by annular wheels; and it consists in constructing the parts, as fully described hereinafter, so as to hang the body low down, reduce friction, and avoid obstructing the entrance to the vehicle.

Figure 1:
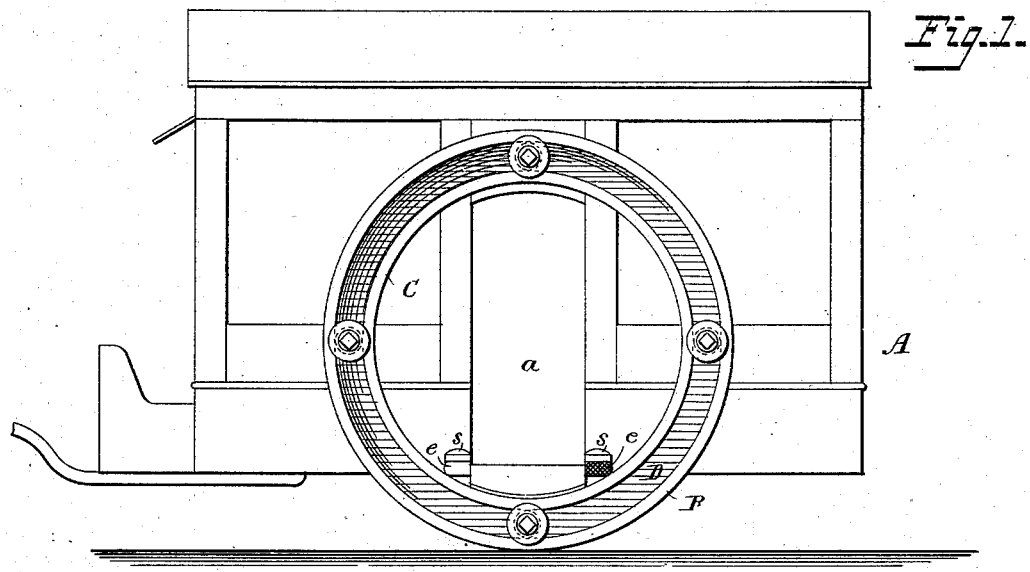
Figure 2:
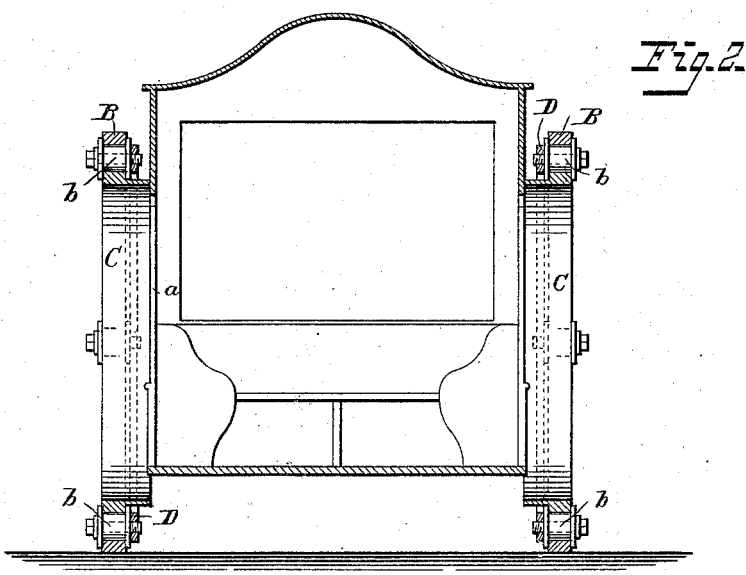

In the drawings, Figure 1 is a side elevation of a vehicle, showing my improvements. Fig. 2 is a sectional elevation; and Fig. 3, a detached section, showing a modification.

The body A of the vehicle is of any suitable character and construction, and the side supporting-wheels consist of rings B B of metal, which extend slightly below the body, in each side of which, within the circle of the wheel, is a doorway, $a$. To each side, within and concentric with the wheel, is firmly secured an annular bearing or ring, C, and between the latter and the wheel is arranged a series of flanged friction-rollers, $b\ b$, each of which turns on a pin projecting from a carrier-ring, D. The annular ring B is thus confined upon the annular bearing C by the flanged rollers, which travel freely between the two, permitting the wheel to revolve easily and with but little friction. As the rollers travel with the wheel, they have no bearing upon their pivots, which serve merely to maintain them in their relative positions.

By the construction described the entrance to the vehicle is free from any obstruction, the bearings for the wheels being all outside of the rings C, so that danger of soiling the clothing in entering or leaving the vehicle is avoided.

By the use of the annular bearings, as set forth, I am enabled to secure spring-bearings for the wheels, springs $e$ being interposed at any suitable points between the rings C and the brackets $s$ on the body of the vehicle.

Figure 3:
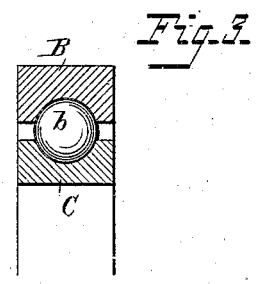

Instead of using flanged friction-rollers, the rings B C may be grooved on their adjacent faces to receive spherical rollers, as shown in Fig. 3.

I claim—

1. The combination, with a vehicle, of annular bearings C, secured to the sides thereof, annular wheels B, revolving round said bearings, and interposed friction-rollers, substantially as specified.

2. The combination of the annular inside stationary bearing, concentric annular wheel, and interposed rollers turning on pins projecting from carrier-rings D, substantially as set forth.

3. The combination of the annular bearing, annular wheel, and flanged rollers interposed between them, substantially as set forth.

4. The combination of the annular wheel, friction-rolls, annular bearing, and springs interposed between the latter and the vehicle, substantially as specified.

In testimony whereof I have signed my name to this specification in the presence of two subscribing witnesses.

A. WYCKOFF.

Witnesses:
CHARLES E. FOSTER,
H. A. HALL.